United States Patent [19]

Mori

[11] Patent Number: 4,523,332
[45] Date of Patent: Jun. 11, 1985

[54] BATTERY SAVER CIRCUIT FOR USE WITH PAGING RECEIVER

[75] Inventor: Toshihiro Mori, Tokyo, Japan

[73] Assignee: NEC Corporation, Tokyo, Japan

[21] Appl. No.: 484,023

[22] Filed: Apr. 11, 1983

[30] Foreign Application Priority Data

Apr. 14, 1982 [JP] Japan .................................. 57-62714

[51] Int. Cl.³ .......................... H04B 1/16; H04Q 9/14
[52] U.S. Cl. .................................. 455/343; 455/228; 340/825.44
[58] Field of Search .......................... 455/38, 228, 343; 340/825.44, 825.48

[56] References Cited

U.S. PATENT DOCUMENTS

| | | | |
|---|---|---|---|
| 4,181,893 | 1/1980 | Ehmke | 455/343 |
| 4,194,153 | 3/1980 | Masaki et al. | 455/343 |
| 4,353,065 | 10/1982 | Mori | 455/343 |
| 4,437,095 | 3/1984 | Akahori et al. | 455/38 |

OTHER PUBLICATIONS

"A Report of the Studies of the British Post Office Code Standardisation Advisory Group" (POCSAG), 7/1979.

*Primary Examiner*—Jin F. Ng
*Attorney, Agent, or Firm*—Sughrue, Mion, Zinn, Macpeak, and Seas

[57] ABSTRACT

The present invention features a battery saver circuit which both conserves battery energy and allows for the prolonging of the energization of high power drain circuits in the event that during any periodic brief battery saving energization a valid incoming signal (a preamble or subsequent message code) is received, whereby the inclusion of a specific address code may be ascertained and the subscriber alerted.

10 Claims, 9 Drawing Figures

BATTERY SAVER CIRCUIT FOR USE WITH PAGING RECEIVER

BACKGROUND OF THE INVENTION

1. Field of the Invention

This invention relates generally to a battery saver circuit for use with a paging receiver, which saver circuit is provided for periodically supplying power to the receiver in short bursts instead of continuously and for keeping the receiver on in the event that the presence of code signals is detected which signals are transmitted subsequently after a preamble.

2. Description of the Prior Art

Radio paging systems have proven very popular and many efforts have been made to reduce their size, weight, and power consumption through the use of integrated circuits.

In connection with power conservation, battery saving circuits are used to minimize power consumption by periodically supplying power to a receiver in short bursts instead of continuously. Presently known battery saver circuits operating in such a radio pager receiver periodically supply power, enabling the search for the presence of a preamble code. If the preamble code is found, then they extend the time period for predetermined sequential codes.

This prior art will further be explained with reference to FIGS. 1A–1C.

FIG. 1A shows a code sequence transmitted from a calling station, wherein a preamble P with a time period T is followed by message and end codes (A and E respectively). FIG. 1B shows pulses B' each having a time period T1 which represents the time duration for which power is supplied to high power drain circuits of the receiver. During this time period T1, the pager receiver is rendered operative and is permitted to search for the preamble. The time periods T1, T2 (power on and off periods respectively) occur sequentially and are chosen to satisfy the equation (2T1+T2=T) so that each of the repetitive pulses B must occur within the duration of a preamble. FIG. 1C shows the application of power to the pager receiver as a result of the detection of the preamble.

FIG. 2 shows a standard code format proposed by the POCSAG (British Post Office Code Standardisation Advisory Group). According to the specification of the POCSAG, a transmission consists of a preamble P followed by batches 1, 2, 3, ..., each batch beginning with a synchronization codeword (SC). The transmission ceases when there are no further calls. Each transmission starts with a preamble to permit the pages to attain bit synchronization and to prepare them to acquire word synchronization. The preamble is a pattern of reversals, 101010 ..., repeated for a period of at least 576 bits, i.e., the duration of a batch plus a codeword. Codewords are transmitted in batches each of which comprises an SC followed by 8 groups or frames each containing 2 codewords. The detailed explanation of the above, is given in the document entitled "A Standard Code for Radiopaging" (available from: Telecommunications Development Department, TD4.2.3. 2-12 Gresham Street, London EC2V7AG, United Kingdom).

In the transmission system of the POCSAG, the preamble is added to the head of a new sequence of calling signals whereby if continuous callings occur then another preamble is not transmitted until the interruption of the callings and the occurrence of the next new signal transmission. Thus, there exists the possibility that only one preamble is transmitted in a day due to an uninterrupted sequence of calls. This means that if the foregoing power consumption technique, in which power is supplied periodically, is applied to the pager receiver operable on the POCSAG code signals, a subscriber may miss the reception of his caller's message. More specifically, if a subscriber switches on to energize his pager after the preamble has already been transmitted, he can no longer receive any message signals. A similar problem may also be encountered when a subscriber is within a building, in the subway or the like where paging signals are too weak to be receive and the preamble goes undetected.

Although the code signals proposed by the POCSAG has been exemplified in the above, similar problems may be encountered with a radio paging system wherein a preamble is added to the head of a new sequence of calling signals and the next preamble is not transmitted until the interruption of the sequence and the occurrence of the next new signal transmission.

SUMMARY OF THE INVENTION

It is therefore an object of the present invention to provide a battery saver circuit for use with a pager receiver, wherein the presence of a valid incoming signal is detected to terminate periodic supply of power for extending the period for which power is supplied to the receiver.

It is another object of the present invention to provide a battery saver circuit for use with a pager receiver, wherein the frequency or baud rate (bits per second) of a valid incoming signal is detected to terminate periodic supply of power for extending the period for which power is supplied to the receiver.

It is yet another object of the present invention to provide a battery saver circuit suitable for use with a pager receiver operable on a standard code such as proposed by the POCSAG.

In general terms the present invention features a battery saver circuit which both conserves battery energy and allows for the prolonging of the energization of high power drain circuits in the event that a valid incoming signal is received during any periodic brief (battery saving) circuit energization, whereby the inclusion of a specific address code may be ascertained and the subscriber is alerted.

More specifically, the present invention takes the form of a battery saver circuit for use with a pager receiver including, a front end having a demodulator for demodulating an incoming signal, a wave shaping circuit coupled to said front end for producing a rectangular signal responsive to the output of said front end, and a battery saver control for periodically supplying power to the receiver under control of timing pulses. The battery saver circuit comprises: a valid incoming signal detector adapted to receive the output of the wave shaping circuit for detecting the frequency or bits per second of the incoming signal and producing a first logic signal indicative of the detection of a valid incoming signal; and a battery saver terminating means responsive to said first logic signal to generate a second logic signal for extending the time period for which power is supplied to the receiver.

BRIEF DESCRIPTION OF THE DRAWINGS

The features and advantages of the present invention will become more clearly appreciated from the following description taken in conjunction with the accompanying drawings in which:

FIG. 1A is a chart showing a code format of a radio paging transmission system, previously referred to;

FIG. 1B is a chart showing the power which is periodically supplied to high power drain circuits of a receiver, also previously referred to;

FIG. 1C is a chart showing the supply of power to the above mentioned high power drain circuits in response to the detection of the presence of a preamble, also previously referred to;

FIG. 2 is a chart showing a standard code format according to the POCSAG, also previously referred to;

DETAILED DESCRIPTION OF THE PREFERRED EMBODIMENTS

Figure 1:
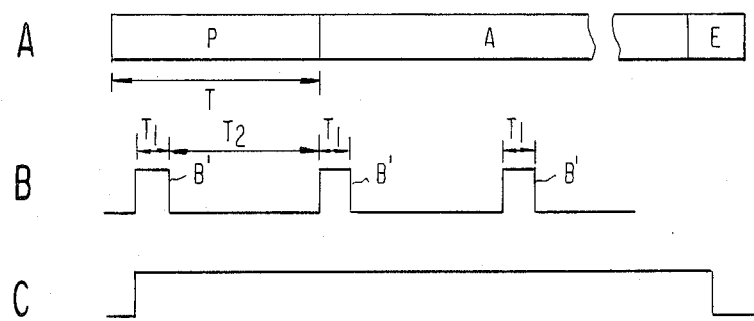
Figure 2:
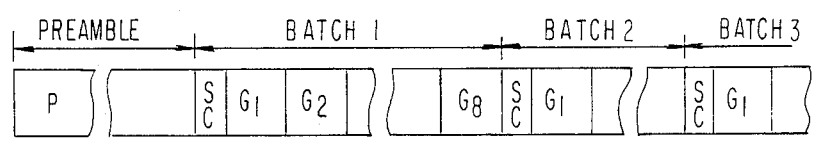
Figure 3:
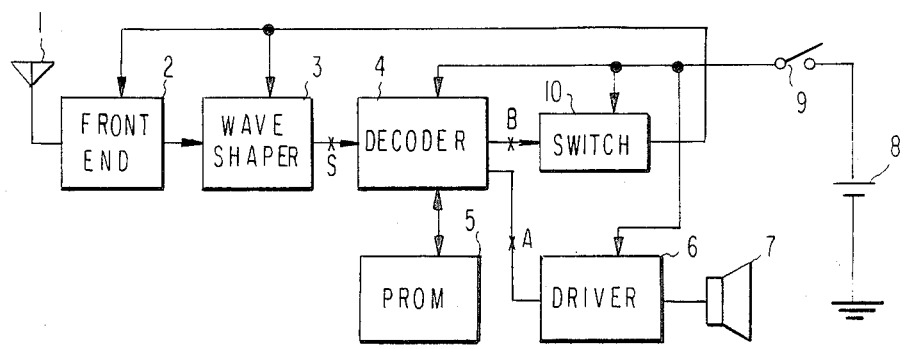
FIG. 3 is a block diagram of one example of a pager receiver to which the battery saver circuit according to this invention is applicable.

Turning now to FIG. 3, there is shown an arrangement in which a DC power source 8 is coupled through an apparatus switch 9 to a decoder 4, an electric switch 10 and a loudspeaker driver 6. The decoder 4 which is directly concerned with this invention will be discussed in detail subsequently. Each circuit section to which the DC power source 8 is directly coupled consumes relatively little power. The decoder 4 periodically supplies a control signal B to the switch 10 to periodically switch it and avoid continuous power consumption. However, upon the detection of a batch or message transmission, the decoder 4 maintains the switch 10 on to enable the search for a predetermined sequential code. Switch 10, when turned on, applies power to a front end 2 (a high frequency receiver section) and a wave shaper 3. Front end 2 is provided for amplifying and demodulating the code-modulated carrier wave received by antenna 1. Front end 2 is a conventional circuit arrangement comprised of a high frequency amplifier, a frequency converter, an IF amplifier, and a discriminator. The output of front end 2 is applied to a wave-shaper 3 which generates an output signal S consisting of a series of rectangular pulses. The signal S from wave-shaper 3 is supplied to the decoder 4 which is also coupled to PROM (Programable Read Only Memory) 5. Decoder 4 searches for an identifying address code by comparing same with a subscriber's unique code prestored in PROM 5. Upon detection of the identifying address code, a signal A is fed to driver 6 to activate a loudspeaker 7 for alerting a subscriber.

Figure 4:
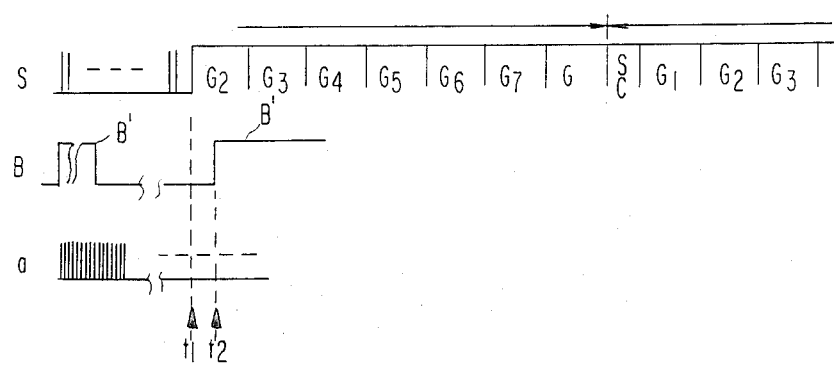
FIG. 4 are time charts showing part of code format proposed by the POCSAG (S), an output signal of a decoder (B), and clock signals (a)

With the above described arrangement, let us consider the case where a subscriber move from an environment wherein the strength of the transmitted signal is too weak to be picked up by the pager, to an environment wherein reception is possible but a preamble has already been transmitted. This situation is shown in FIG. 4. That is to say, a situation wherein at time t1 the transmission of signal S is receivable and at time t2 the decoder 4 produces the control pulse B' which enables the front end 2 and wave shaper 3 to receive a message or batch transmission.

Figure 5:
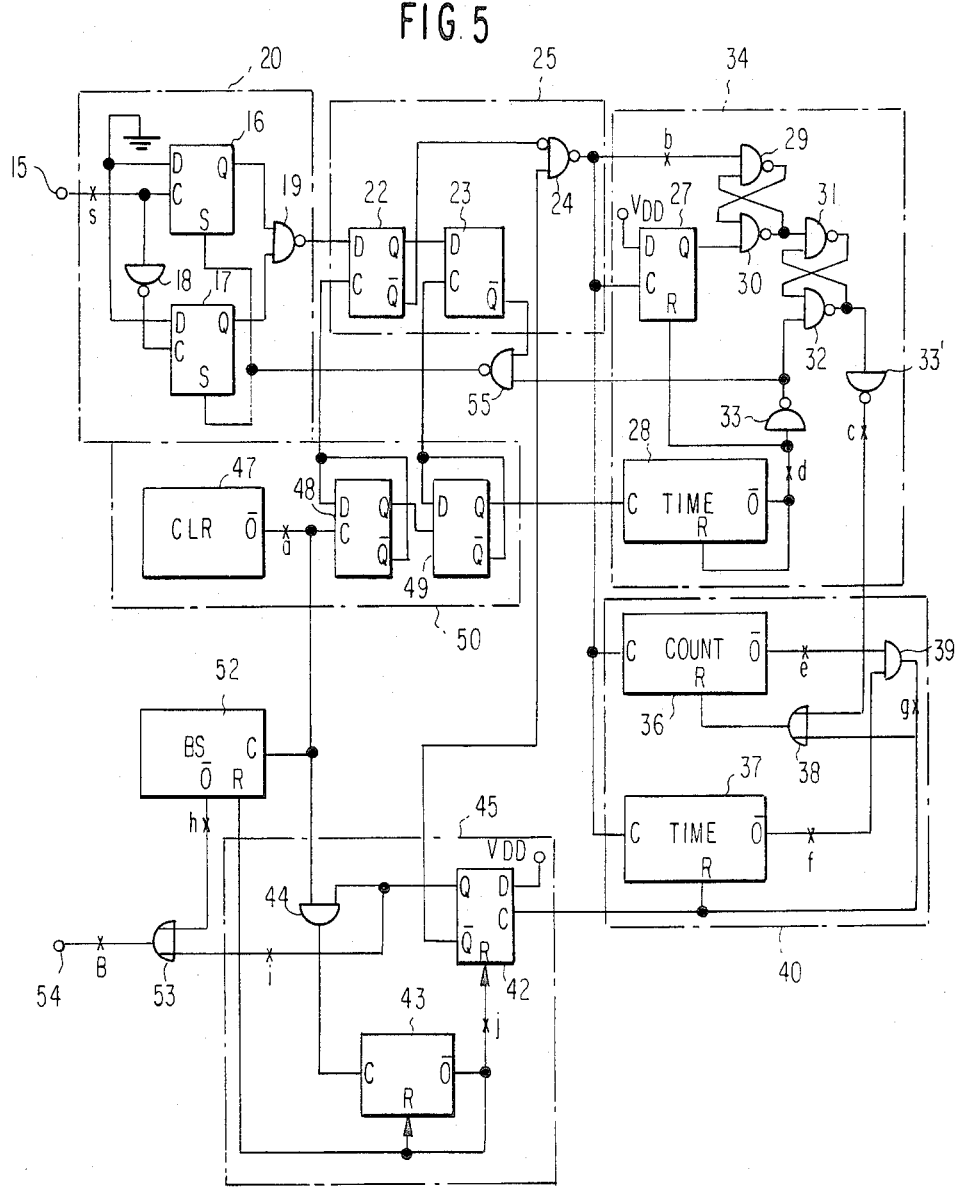
FIG. 5 is a detailed circuit diagram of an embodiment of the present invention.
Figure 6:
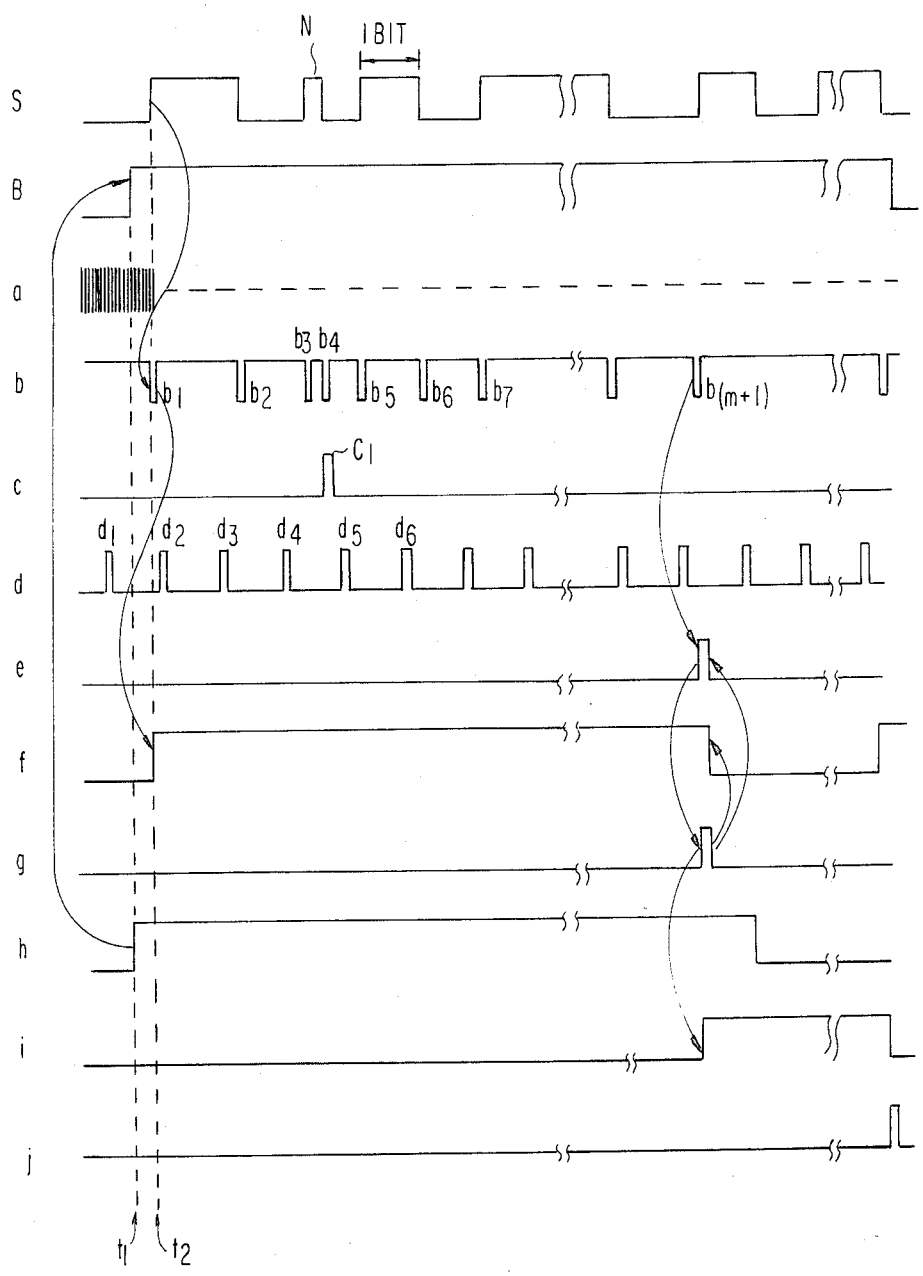
FIG. 6 is a time chart of various logic signals appearing in the FIG. 5 circuit.

The battery saver circuit of this invention, forming part of the decoder 4, will now be described in detail with reference to FIGS. 5 and 6, where it is assumed that a preamble has already transmitted and subsequent massage or batch codes are receivable. When the circuit of FIG. 5 is initially rendered operative by turning on the main switch 9 (FIG. 3), all the D flip-flops of the circuit are reset. A battery saver control circuit 52 periodically outputs pulses "h" at a prefixed interval although only one is shown in FIG. 6. The occurrence of the control pulse "h" is controlled by timing pulses "a" applied from a clock generator 47 of a multi-timer 50. The pulse "h" passes through an OR gate 53 and is then applied, via an output terminal 54, to the switch 10 (FIG. 3) as control signal B. The signal B actuates the switch 10 for periodically supplying power to the front end 2 and the wave-shaping circuit 3 (FIG. 3). It should be noted at this time that a pulse "i" assumes a low logic state. When the pulse "i" goes high (assumes a high logic state), the periodic power supply is terminated allowing the receiver to search for an identifying address code involved in batch or message codes. The transition of pulse "i" from low level to the high will be described later on.

The multi-timer 50 comprises the clock 47 and two D flip-flops 48, 49. The flip-flops 48 and 49 have been initially reset as referred to previously. The flip-flop 48 changes its logic state every two occurrences of timing pulses "a" and thus the output Q of flip-flop 49 assumes a low logic state every four timing pulses "a". A timer 28 responds to the high logic signal applied from the flip-flop 49 generating a train of pulses "d" ($d_1$, $d_2$, $d_3$, $d_4$, ...) each of which has a time duration identical with that of one bit of a desired incoming signal. The pulse "d" is inverted by an inverter 33 and then the inverted pulse sets the flip-flops 16 and 17 through an NAND gate 55, and is also directly applied to and resets a D flip-flop 27.

When the signal "h" goes high at a time $t_1$ (FIG. 6), the pulse B goes high in response thereto. Assuming that the signal S on an input terminal 15 goes high at a time $t_2$, the flip-flop 16 is reset and creates a low logic state at its output Q while the flip-flop 17 remains set in that the signal S is inverted by an inverter 18. A NAND gate 19 creates a high logic state in response to the resetting of the flip-flop 16, and thus sets a D flip-flop 22 of a shift register 25 in response to the rising edge of the pulse created on the Q output of the flip-flop 48. The differentiator 20 includes the two flip-flops 16 and 17, the inverter 18 and the NAND gate 19. During the battery saving operation, a D flip-flop 42 of a battery saver inhibit circuit 45 remains reset so that the output pulse "b" of a NAND gate 24 remains high prior to the setting of flip-flop 22. When the flip-flop 22 is set, the output of AND gate 24 is switched to the low level (a pulse "$b_1$"). The setting of flip-flop 22 also allows a D flip-flop 23 to be set in response to the rising edge of the pulse created on Q output of flip-flop 49 and thus creates a low logic state on its Q output. Therefore the flip-flop 16 is again set by a high logic output of the NAND gate 55 irrespective of the output of the NAND gate 33. Now that both flip-flops 16 and 17 have been set, the NAND gate 19 subsequently exhibits a low logic state with the result of a high logic state present on the Q output of the flip-flop 22, thereby resulting in a high logic state of the signal "$b_1$". This means that pulse width of "$b_1$" is identical with two periods of the timing pulse "a", and this also applies to the pulse width of each of the other pulses "$b_2$", "$b_3$", "$b_4$", . . . of the signal "b". The shift register 25 includes the two flip-flops 22, 23, and the NAND gate 24. We have discussed the circuit operation assuming that the signal S goes high at the time $t_2$, however the same discussion applies to the case where the signal S goes low. In the latter case, more specifically, the flip-flop 17 responds to the transition of signal S from a high logic level to the low through the provision of inverter 18, in the case of which it should be noted that the flip-flop 16 in turn remains set.

A noise detector 34 will hereinafter be discussed which comprises the aforementioned flip-flop 27, a RS flip-flop consisting of two NAND gates 29 and 30, another RS flip-flop consisting of two NAND gates 31 and 32, the NAND gate 33, the timer 28 and an inverter 33', all of which are coupled as shown. The timer 28 outputs a train of reset pulses $d_1$, $d_2$, $d_3$, $d_4$, . . . each having a period identical with the time duration of one bit of a valid incoming signal. The signal "d" is used to periodically reset the flip-flop 27 which therefore periodically creates a low logic state on its output Q resulting in a high logic state on the output of NAND gate 30.

In the interest of easy understanding of the circuit operation, let us consider the time period defined by time points $t_1$ and $t_2$, wherein the pulses "b" and "d" assume high and low logic states respectively. Within this period the flip-flop 27 has been reset by pulse $d_1$ and remains unchanged resulting in the high logic state on the output of the NAND gate 30. Therefore the NAND gate 29 creates a low logic state in that the signal "b" assumes a high logic state. The inverter 33 applies a high logic output to one input terminal of the NAND gate 32. It should be noted that the RS flip-flop consisting of NAND gates 31 and 32 has been reset by the leading edge of pulse $d_1$. As a result, the NAND gate 32 creates a high logic state in this particular case. Thus a signal "c" remains low as shown in FIG. 6.

Upon the occurrence of the pulse $b_1$, a counter 36 counts the pulse $b_1$, and a timer 37 is triggered by the trailing edge of pulse $b_1$ to generate a pulse "f" having a high logic level with a predetermined time duration. The counter 36 and the timer 37 define a valid incoming signal detector 40, together with an OR gate 38 and an AND gate 39. The pulse $b_1$ sets the flip-flop 27 resulting in a high logic state present on the Q output thereof. However, the flip-flop 27 is again reset by the subsequently occurring pulses $d_2$ and $d_3$. The pulse $b_2$ following $b_1$ is also counted by the counter 36 and sets the flip-flop 27 which will again be reset by pulse $d_4$. If noise N occurs between pulses $d_4$ and $d_5$, then pulses $b_3$ and $b_4$ are generated accordingly and creates a pulse $c_1$ on the output of inverter 33'. Thus pulse $c_1$ resets or zeroes out the counter 36 which is set by pulse $b_5$ again commencing the counting of the pulses "b". When the counter 36 counts up a prefixed number of pulses "b" by counting a pulse $b_{(m+1)}$, it produces a pulse "e". If the pulse "e" occurrs before the end of pulse "h", i.e., within the time duration of the high logic state of pulse "h", then a pulse "g" is created from the AND gate 39, which pulse "g" indicates that a valid incoming signal followed by the preamble is detected. The pulse "g" is applied to the clock terminal C of the flip-flop 42 thereby setting same. The pulse "g" is further used to reset both the counter 36 and the timer 37. The setting of the flip-flop 42 results in a high logic state on its Q output (pulse "i") and also results in a low logic state on its Q output thereby closing the NAND gate 24 of the shift register 25. The pulse "i" is fed to an AND gate 44 which responds to the timing pulse "a" applying a trigger pulse for rendering a timer 43 operative. Thus timer 43 generates a pulse "j" after a time period selected so that the pager receiver can detect the message codes. The pulse "j" resets flip-flop 42, timer 43, and battery saver control circuit 52.

Figure 7:
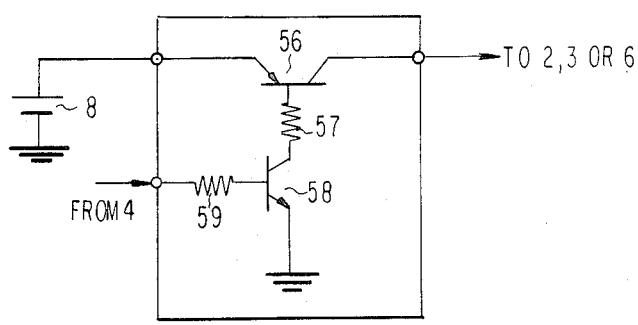
FIG. 7 is an example of a circuit diagram of a switch or a loudspeaker driver in FIG. 3.

FIG. 7 is a circuit diagram showing one example of the switch 10 or the loudspeaker driver 6 (FIG. 3) which comprises two transistors 56, 58 and two resistors 57, 59, all of which are coupled as shown. To the base of the transistor 58 is applied the control signal B from the decoder 4. Signal B controls the transistor 58 which in turn controls the switch over of transistor 56 for selective power supply to the circuits connected to its collector, viz., front end 2 and wave shaper 3.

For the clock 47 a multivibrator is available. Timers 28, 37, 43, counter 36, and battery saver control 52 can be realized by using for example PD4020 manufactured by NEC and a plurality of logic gates coupled thereto. To provide the PROM 5, PB487R available from NEC is suitable. The decoder 4 can be replaced by a CPU.

As can be understood from the foregoing, the battery saver circuit according to the present invention is able to effectively detect a valid incoming signal (a preamble and/or subsequent message codes), thereby enabling the battery saving operation to be terminated for continuous energization of a pager receiver.

The foregoing description shows only preferred embodiment of the present invention. Various modifications are apparent to those skilled in the art without departing from the scope of the present invention which is only limited by the appended claims.

What is claimed is:

1. A battery saver circuit for use with a pager receiver including, a front end having a demodulator for demodulating an incoming signal which includes a preamble and a message signal following the preamble, a wave shaping circuit coupled to said front end for producing a rectangular signal responsive to the output of said front end, and a battery saver control for periodically supplying power to the receiver under control of timing pulses, said battery saver circuit, comprising:
   a valid incoming signal detector adapted to receive the output of said wave shaping circuit for detecting the baud rate of either of said preamble or said message signal and producing a first logic signal indicative of the detection of a valid incoming signal; and
   a battery saver terminating means responsive to said first logic signal to generate a second logic signal for extending the time period for which power is supplied to said receiver.

2. A battery saver circuit as claimed in claim 1, wherein said valid incoming signal detector comprises:
   first means for receiving and responding to the transition of the output of said wave shaping circuit and for generating a third logic signal indicative of the presence of noise in the event that the number of occurrence of said transition is more than 2 within a first predetermined time period;
   a second means resettable responsive to said third logic signal and counting the occurrence of said transition for generating said first logic signal when the counted number reaches a predetermined number within a second predetermined time period longer than said first predetermined time period.

3. A battery saver circuit as claimed in claim 2, wherein said first predetermined time period is equal to a time period of one bit of a desired incoming signal.

4. A battery saver circuit as claimed in claim 2, wherein said first means comprises, a differentiator responsive to the transition of said rectangular signal for creating a corresponding logic state, a shift register responsive to said logic state of said differentiator for producing a corresponding pulse, and a noise detector switchable in response to two successive pulses applied from said shift register within said first predetermined time period to generate said third logic signal.

5. A battery saver circuit as claimed in claim 4, wherein said differentiator comprises a first flip-flop having an input coupled to the output of said wave shaping circuit, a second flip-flop having an input coupled through an inverter to the output of said wave shaping circuit, a NAND gate having two inputs coupled to said first and second flip-flops.

6. A battery saver circuit as claimed in claim 4, wherein said shift register comprises a first flip-flop having a first input coupled to the output of said differentiator and a second input for receiving said timing pulses, a second flip-flop having a first input coupled to one output of said first flip-flop and a second input for receiving said timing pulses and having an output for producing a control pulse supplied to said differentiator.

7. A battery saver circuit as claimed in claim 4, wherein said noise detector comprises a first flip-flop with an input coupled to the output of said shift register, a timer which is controlled by said timing pulses and is reset by the output of itself, a second flip-flop with two inputs coupled to said shift register and to one output of said first flip-flop respectively, a third flip-flop having a first input coupled to one output of said second flip-flop and having a second input for receiving the output of said timer and having an output from which said third logic signal is produced.

8. A battery saver circuit as claimed in claim 2, wherein said second means comprises, a counter for counting the occurrences of said transition and being reset by either said first or third logic signal, a timer which is responsive to the occurrence of said transition for generating a timing pulse having a pulse width equal to said second predetermined time period and which is reset by said third logic signal.

9. A battery saver circuit as claimed in claim 8, wherein said second means further comprises an OR gate having a first input coupled to said first means and a second input coupled to both said battery saver terminating means and a reset terminal of said timer, and an AND gate having a first input coupled to the output of said counter and a second input coupled to the output of said timer and having an output coupled to said second input of said OR gate.

10. A battery saver circuit as claimed in claim 1, wherein said battery saver terminating means comprises a flip-flop responsive to said first logic signal for producing said second logic signal, and a timer responsive to said second logic signal for determining a time period for which said second logic signal is generated.

* * * * *